(12) United States Patent
Rapp et al.

(10) Patent No.: US 7,774,798 B2
(45) Date of Patent: Aug. 10, 2010

(54) SYSTEMS AND METHODS FOR PROVIDING AN INTERACTION BETWEEN A STATUS MANAGEMENT SERVICE AND AN AUDIT TRAIL SERVICE

(75) Inventors: Roman Rapp, Villeneuve Loubet (FR); Julien Delvat, Antibes Juan les Pins (FR)

(73) Assignee: SAP AG, Walldorf (DE)

( * ) Notice: Subject to any disclaimer, the term of this patent is extended or adjusted under 35 U.S.C. 154(b) by 1022 days.

(21) Appl. No.: 11/508,228

(22) Filed: Aug. 23, 2006

(65) Prior Publication Data

US 2007/0265868 A1    Nov. 15, 2007

(30) Foreign Application Priority Data

Apr. 28, 2006    (EP)    .................. 06290710

(51) Int. Cl.
G06F 3/00    (2006.01)
G06F 15/16    (2006.01)
(52) U.S. Cl. ........................ 719/328; 709/246
(58) Field of Classification Search .................. 719/328; 709/246

See application file for complete search history.

(56) References Cited

U.S. PATENT DOCUMENTS 7,412,497 B2 *    8/2008    Viswanath et al. ........... 709/220

2002/0032640 A1    3/2002    LaFore et al.
2002/0165724 A1 *    11/2002    Blankesteijn .................. 705/1
2002/0188513 A1    12/2002    Gil et al.

OTHER PUBLICATIONS

Kenneth R. Abbott, Experiences with workflow Management: Issues for the next Generation, 1994.*
Communication and Search Report from the European Patent Office, dated Jul. 21, 2006 (6 pages).

* cited by examiner

*Primary Examiner*—Lechi Truong
(74) *Attorney, Agent, or Firm*—Finnegan, Henderson, Farabow, Garrett & Dunner, LLP

(57) ABSTRACT

Systems and methods are disclosed for providing an interaction between a status management service and an audit trail service. In one embodiment, a computer-implement method provides the interaction by enabling an audit of a business object when the business object reaches a designated status. At an application server, a change associated with the business object is received. In response to the change, it is determined whether the business object is a status business object and an auditable business object. If so, a status function set is implemented to interface with the application server to determine whether the change to the business object is allowed. The method also determines whether the business object has reached the designated status. When the business object has reached the designated status, auditing data is requested for the business object.

15 Claims, 5 Drawing Sheets

300

| Status | | |
|---|---|---|
| Name | Description | With Audit |
| INITIAL | Initial | |
| RELEASED | Released | X |
| COMPLETED | Completed | X |
| ARCHIVED | Archived | X |
| CHECKED | Checked by Manager | X |
| ... | | |

FIG. 3

SYSTEMS AND METHODS FOR PROVIDING AN INTERACTION BETWEEN A STATUS MANAGEMENT SERVICE AND AN AUDIT TRAIL SERVICE

BACKGROUND

1. Technical Field

The present invention generally relates to service oriented architectures and to systems and methods for providing an interaction between a status management service and an audit trail service. More particularly, and without limitation, embodiments consistent with the present invention relate to systems and methods that are adapted to activate an audit trail service when a business object has reached a designated status.

2. Background

The manner in which enterprises conduct business continues to evolve due to advances and changes in the marketplace. Whether these advances and changes occur through growing competition and globalization, mergers and acquisition, or a revamping of business models, the key for success will often depend on how quickly an enterprise's information technology (IT) organization can adapt to evolving business needs. Therefore, a major challenge to these enterprises is how they handle change.

For organizations to maintain business agility, they must ensure that enterprise applications are not only high-performance business engines driving efficiencies, but also that they become flexible building blocks of future business systems. A recent and promising solution has risen in the form of services. A service, such as a Web service or program, represents a self-contained and self-describing piece of application functionality that can be found and accessed by other applications. A service can be considered self-contained because the application using the service does not have to depend on anything other than the service itself. A service can be considered self-describing because all the information on how to use the service can be obtained from the service itself. Descriptions for a service are centrally stored and accessible through standard mechanisms.

Rather than requiring programmers to establish and maintain links between applications, services are loosely coupled, making connections simpler and more flexible and allowing application architects to more easily find and understand services offered by other cooperative applications. However, services are often designed to expose functionality of individual applications and, thus, are too limited to be efficient building blocks for enterprise-wide business processes. A solution to this shortfall has been the migration to a Service Oriented Architecture (SOA). SOA is an open architecture middleware, which builds on the benefits of services. An example of an SOA can be found in the Enterprise Service Framework (ESF), which is commercially available from SAP AG (Walldorf, Germany). Furthermore, the term "SOA" may also refer to "distributed objects" architecture, such as CORBA (Common Object Request Broker Architecture) and DCOM (Distributed Component Object Model).

SOA enables the abstraction of business objects, modeled as services (also referred to as enterprise services), from actual applications. Aggregating services into business-level enterprise services may provide more meaningful building blocks for the task of automating enterprise-scale business scenarios. Enterprise services may also allow IT organizations to efficiently develop composite applications, which combine functionality and information from existing systems to support new business processes or scenarios.

SOA also enables the use of an enterprise services repository. An enterprise services repository stores relevant pre-existing enterprise services and makes them available to selected partners and customers. By using the enterprise services repository, these selected partners and customers can use the pre-existing enterprise services to aid in the implementation of new services and corresponding business objects. In particular, the term "object" refers to a software bundle of variables (e.g., data) and related methods. For example, in object-oriented programming, an object is a concrete realization (instance) of a class that consists of data and the operations associated with that data. The term "business object" represents a physical or logical object of significance to a business, such as a purchase order.

Frequently, there are many situations where a business should record changes to business objects implemented by partners and customers. For example, an online transaction processing system should record alteration, creation, or deletion of a business object and its transactional data in order to track changes for internal or regulatory reasons, such as for financial audits. In addition, there are also situations where a business would like to use status information regarding business objects to indicate which kinds of tasks may be performed on the business object. For example, a business object may be deleted or altered depending upon its status.

Currently, there are different specialized status management and auditing solutions for different business objects. However, in current systems, existing SOAs fail to provide generic status management and auditing services that may be used by any kind of business object in a SOA. Instead, current solutions are specific to particular kinds of data and are costly to design, implement, and maintain. Therefore, there is a need for centralized status management and audit trail services that are suitable for any business object. Furthermore, there is a need for functionality that enables these generic status management and audit trail services to interact in an efficient manner when handling a business object.

SUMMARY

Consistent with an embodiment of the present invention, a computer-implemented method provides an interaction between a status management service and an audit trail service. The interaction enables an audit of a business object when the business object reaches a designated status. The method comprises receiving, at an application server, a change associated with the business object. In response to the change, the method determines whether the business object is a status business object and an auditable business object. When the business object is an status business object and an auditable business object, the method implements a status function set to interface with the application server to determine whether the change to the business object is allowed. Through a first called method of the status function set, a notification indicates whether the change is allowed. Through a second called method of the status function set, the method determines whether the business object has reached the designated status. When the business object has reached the designated status, the method requests auditing data for the business object. The business object implements an auditable function set to interface with the application server. Through a called method of the auditable function set, the method receives the requested auditing data.

Consistent with another embodiment of the present invention, a system provides an interaction between a status management service and an audit trail service. The interaction enables an audit of a business object when the business object reaches a designated status. The system comprises an element for receiving, at an application server, a change associated with the business object. An element determines, in response to the change, whether the business object is a status business object and an auditable business object. When the business object is a status business object and an auditable business object, an element implements a status function set to interface with the application server to determine whether the change to the business object is allowed. An element receives, through a first called method of the status function set, a notification indicating whether the change is allowed. An element determines, through a second called method of the status function set, whether the business object has reached the designated status. When the business object has reached the designated status, an element requests auditing data for the business object. The business object implements an auditable function set to interface with the application server. An element receives, through a called method of the auditable function set, the requested auditing data.

Consistent with yet another embodiment of the present invention, a computer readable medium comprises programmable instructions adapted to perform a computer-implemented method for providing an interaction between a status management service and an audit trail service. The interaction enables an audit of a business object when the business object reaches a designated status. The method comprises receiving, at an application server, a change associated with the business object. In response to the change, the method determines whether the business object is a status business object and an auditable business object. When the business object is a status business object and an auditable business object, the method implements a status function set to interface with the application server to determine whether the change to the business object is allowed. Through a first called method of the status function set, a notification indicates whether the change is allowed. Through a second called method of the status function set, the method determines whether the business object has reached the designated status. When the business object has reached the designated status, the method requests auditing data for the business object. The business object implements an auditable function set to interface with the application server. Through a called method of the auditable function set, the method receives the requested auditing data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings:

FIG. 3 shows an exemplary table of a status definition of a business object, consistent with an embodiment of the present invention;

DETAILED DESCRIPTION

Figure 1:
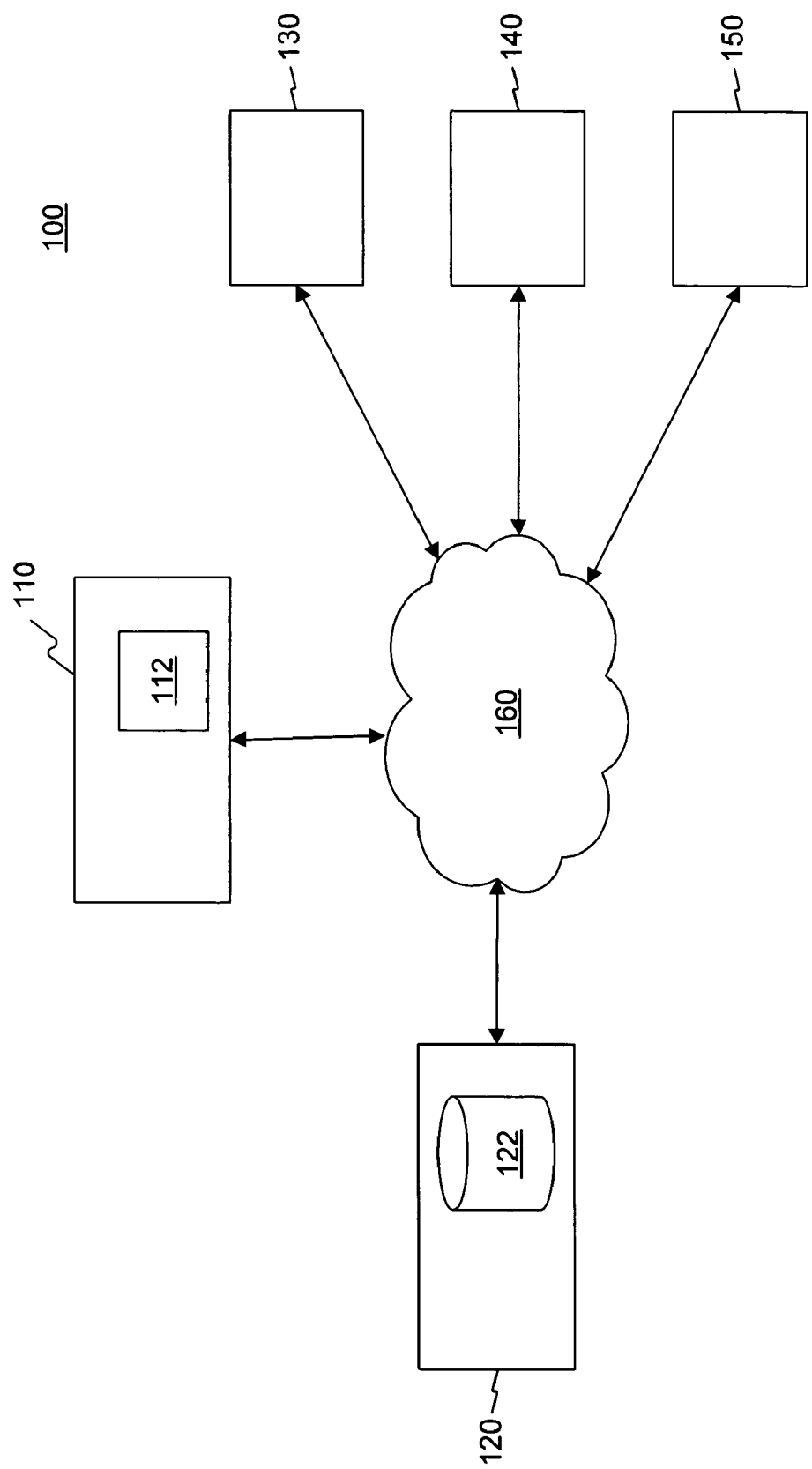
FIG. 1 is a diagram of an exemplary system for implementing embodiments of the present invention.

Embodiments consistent with the present invention are directed to systems, methods, and computer-readable media for providing an interaction between a status management service and an audit trail service. Embodiments consistent with the invention may be implemented in various environments, including computer-based environments, such as personal computers, workstations, servers, laptops, personal digital assistants (PDAs), mobile phones, handheld devices, and other computing devices, workstation, networked and other computing-based environments with one or more users. Embodiments consistent with the present invention, however, are not limited to such examples and may be implemented with other platforms and in other environments.

By way of example, embodiments consistent with the invention may be implemented using conventional personal computers (PCs), desktops, hand-held devices, multiprocessor computers, pen computers, microprocessor-based or programmable consumer electronic devices, minicomputers, mainframe computers, personal mobile computing devices, mobile phones, portable or stationary personal computers, palmtop computers or the like.

The storage media referred to herein symbolize "elements" that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments consistent with the invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Transmission protocols and data formats are also known, such as, for example transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), SOAP (simple object access protocol), etc. Such features may be utilized to implement embodiments consistent with the present invention, as disclosed herein.

In a service oriented architecture (SOA), such as, for example, SAP's Enterprise Service Architecture, business objects may use a status management service and an audit trail service that are implemented as central services. Systems and methods consistent with the present invention implement an interaction between a status management service and an audit trail service. In particular, embodiments of the present invention activate the audit trail service when a business object has reached a designated status.

Consistent with embodiments of the present invention, a status management service provides methods and interfaces to generically handle a status management process of any type of business object that may need a status management service. Accordingly, one may obtain an overview of the status of a given business object or allow and/or prevent actions to it (e.g., changing values, deleting the object, etc.).

A business object that includes status information may be referred to as a "status business object." For example, business objects that use the status management service may implement an interface to determine whether the business object has an associated status and is, therefore, a status business object. Various actions may be performed on a status business object, such as, for example, creating a value, changing a value, changing a status, or deleting the object. Every time a status business object is created, the status business object may be assigned a default status that defines that actions that can or cannot be performed on it. During the lifecycle of a status business object, its status can be retrieved and/or changed by the user of an application. Furthermore, the status management service may ensure that dependent objects also have their status changed in order to keep the data model synchronized with a database.

Consistent with embodiments of the present invention, an audit trail service may provide functionality to implement generic auditing of business objects. For example, business objects that use the audit trail service may implement an interface to determine whether the business object is auditable. A business object that is auditable may be referred to as an "auditable business object."

In order to audit business objects, the audit trail service may log changes to business objects and allow access to logged changes as needed. Changes made to business objects may be audited and audit data may be stored at a central repository by any person or machine that may require such access. For example, a business object that is configured to use the generic audit trail service, i.e., an auditable business object, may implement a method that is used to generate a notification of a change associated with the business object. Furthermore, a notification of a change may be generated for any kind of change to the auditable business object, such as when the auditable business object is created, deleted, etc.

The audit trail service may also request information associated with an auditable business object. For example, the auditable business object may implement a method that can return data associated with the business object, such as a globally unique identifier (GUID), a timestamp indicating when a change was made, an identity of user who made the change, a business object type, etc. Furthermore, the audit trail service may allow a user to request specific data regarding the changes that were made to the auditable business object. For example, a method may create a record of the reason for making a change to the auditable business object. After receiving a notification of commitment of the change, the audit trail service may store the changes made to the auditable business object.

Embodiments consistent with the present invention may also bring together functionalities of the status management service and the audit trail service. In particular, embodiments consistent with the present invention may implement an interaction service for starting an audit of a business object when that object reaches a designated status. In order to provide such an interaction, the business object must be both a status business object and an auditable business object.

As an example, a user may prepare a quote for a customer that is stored as a business object. The user may finalize the quote, which is then sent via a network to the customer. The status management service may maintain a record that tracks any changes, such as a change in the price of the quote. However, when the business object reaches a certain status, i.e., when the user wishes to monitor a change, an audit method may be called by the audit trail service in order to audit the business object.

In order to implement an interaction between the two services, embodiments consistent with the present invention may provide additional functionalities to the status management and audit trail services in the form of an interaction service. While both services can operate independent of each other, the interaction service may provide users with increased functionality and flexibility. Furthermore, in a SOA, the interaction may occur centrally and generically so that the interaction does not need to be re-implemented for different business objects.

FIG. 1 illustrates an exemplary system 100 for implementing embodiments consistent with the present invention. System 100 may implement a service oriented architecture, such as SAP's Enterprise Services Architecture (ESA). Furthermore, system 100 may be physically distributed over a number of computer systems that are interconnected by one or more networks. Various networked computer systems that constitute system 100 may use any number of different operating systems and programming languages.

As shown in FIG. 1, system 100 may include an application service 110, a repository server 120, and terminals 130, 140, and 150. Further, application server 110, repository server 120, and terminals 130, 140, and 150 are connected via a network 160. One of skill in the art will appreciate that although two kinds of servers and three terminals are depicted in FIG. 1, any number of servers and terminals may be provided. Moreover, one of ordinary skill in the art will recognize that functions provided by one or more components of system 100 may be combined. For example, application server 110 and repository server 120 may be implemented as one server.

Network 160 facilitates communication between the various entities in system 100, such as application server 110, repository server 120, and terminals 130-150. In addition, application server 110, repository server 120, and/or terminals 130-150 may access legacy systems (not shown) via network 160, or may directly access legacy systems and/or databases.

Network 160 may be a shared, public, or private network and encompasses a wide area or local area. Accordingly, network 160 may be implemented through any suitable combination of wired and/or wireless communication networks.

Furthermore, network 160 may comprise a local area network (LAN), a wide area network (WAN), an intranet, or the Internet.

Application server 110 may comprise a general purpose computer (e.g., a personal computer, network computer, server, or mainframe computer) having a processor (not shown) that may be selectively activated or reconfigured by a computer program to perform one or more methods consistent with the present invention. Application server 110 may also be implemented in a distributed network. Alternatively, application server 110 may be specially constructed for carrying-out methods consistent with the present invention. Furthermore, application server 110 may include a data storage 112 for storing software modules that implement a status management service, an audit trail service, and interaction functionality between the two services. Exemplary software modules are discussed in further detail with respect to FIG. 2.

Repository server 120 may include a database 122. Database 122 may be implemented with any one of a number of commercially available repositories. However, in a preferred embodiment, the Enterprise Services Repository from SAP AG is used. Furthermore, repository server 120 may employ any of a number of commercially available database systems, such as Microsoft Access, dbase, Oracle, Sybase, etc. Database 122 may store instances of business objects and events. Furthermore, repository server 120 may be available via network 160 and may interact with software executing on application server 110 and/or or with software executing on terminals 130-150. For example, objects stored in database 122 may be accessed by application server 110 or terminals 130, 140, or 150.

The business objects stored in database 122 may be implemented as, for example, SAP business objects. Services associated with SAP business objects describe complete elementary steps in business processes, such as making a purchase order, providing a product cost estimate, invoicing a customer for a service, etc. These services can be implemented as methods of business objects. The encapsulation of the description of a complete business process step in such a business object reduces complexity because the inner structure of the business object remains concealed. By invoking services of the business objects, external applications may access and manipulate the business objects via the Internet, SAP Exchange Infrastructure (XI), DCOM or CORBA, for example. In at least one embodiment, objects stored in database 122 may be accessed by means of Business Application Programming Interfaces (BAPI), a well-known and widely used application interface used to achieve interoperability between various systems and to integrate third party software components with software offered by SAP AG. In another exemplary environment, such as one using an existing SAP NetWeaver architecture, the Enterprise Services Infrastructure (ESI) provides access to the business objects.

Terminals 130-150 may be any type device for communicating with application server 110 and/or repository server 120 over network 160. For example, terminals 130-150 may be personal computers, handheld devices, or any other appropriate computing platform or device capable of exchanging data with network 160. Terminals 130-150 may each include a processor (not shown) and data storage (not shown) for storing data.

Figure 2:
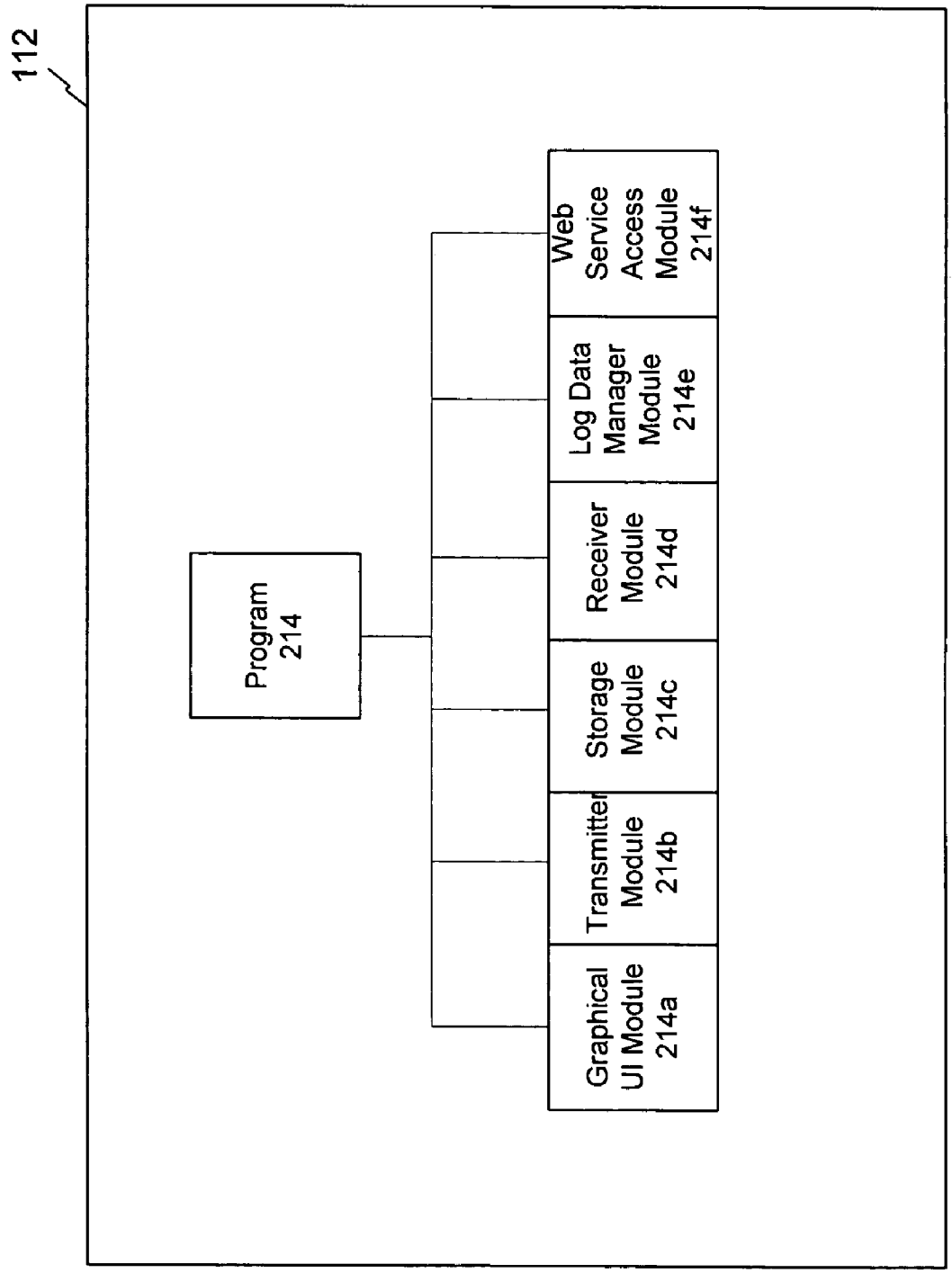
FIG. 2 shows an exemplary software architecture for implementing an interaction service between a status management service and an audit trail service, consistent with an embodiment of the present invention.

FIG. 2 shows an exemplary software architecture for implementing an interaction between a status management service and an audit trail service, consistent with an embodiment of the present invention. The software architecture may be stored in data storage 112 (see FIG. 1). In one embodiment, data storage 112 stores instructions of program 214. Program 214 may include instructions in the form of one or more software modules 214a-214f. Software modules 214a-214f may be written using any known programming language, such as ABAP, XML, etc.

Graphical user interface module 214a can provide processing to display status and auditing data and generate other graphical user interfaces for a user or client. Transmitter module 214b can be used to request the transfer of business object data, status data, and auditing data, from a client to application server 110. Storage module 214c can be used to save changes to business objects, status data, and auditing data for persistent storage. Receipt module 214d can receive status and auditing requests and transfer them to transmitter module 214b. Log data manager module 214d may be used to administer the persistency of status and auditing data. For example, log data manager module 214e may also include an application program interface to provide data access. Web service access module 214f may be used to provide access to the status and auditing data from remote locations.

One of ordinary skill in the art will appreciate the listed software modules are exemplary only and any variation of modules including the addition of other modules can be used. A skilled artisan will also appreciate that program 214 may alternatively, or in addition to, be included in a separate business object stored in repository server 120 or in a separate business object on a different computing system.

In one embodiment, to perform status and auditing functions, program 214 may include instructions in the form of methods. These methods may be implemented as part of one or more modules or as separate sets of computer-readable instructions. For example, for business objects to be able to use the status management service provided by application server 110, the business objects preferably implement methods that can be called by application server 110 (herein referred to as a "status function set"). An exemplary list of methods that can be included in the status function set implemented via program 214 are shown below in Table 1. Program 214 may also include attributes, such as a status stack, as shown below. One of ordinary skill in the art will appreciate that program 214 is not limited to the exemplary list of methods and attributes and additional or fewer methods or attributes can be used.

TABLE 1

Status Management Service

+get_default_status( )
+get_possible_statuses( )
+get_possible_actions( )
+handle_status_changed (in ChangedObject : IF_STATUS_OBJECT)
+check_action_allowed( )
+set_object_status( )
+get_object_status( )
+save( )
+register_action( )
+handle_action( )
+is_auditable( )
− status_stack The status management service may direct application server 110 to store a temporary status of an instantiated foundation business object that is currently being processed by, for example, an external application. After processing the instantiated business object, a command may be received from, for example, an external application that has performed the processing such that the temporary status is stored. For example, a respective status that has been previously stored for the business object is overwritten by the temporary status in response to a save command. If execution of the external application is terminated unsuccessfully, then the temporary status is not stored and the original status of the business object is maintained.

Furthermore, the status management service may implement on or more methods for instantiating a business object. The instantiated business object then initiates the instantiation of a dependent business object. After instantiation of the dependent business object, the instantiated dependent business object executes the status management service in order to provide an initial status, to execute a status change, and/or to communicate allowed actions that can be performed on the instantiated business object depending on its actual status. In particular, the "is_auditable( )" method is used in order to implement interactive functionality between the status management service and the audit trail service. The "is_auditable( )" method may determine whether certain a business object status should trigger the audit trail service or not. For example, certain changes may trigger an audit and other changes may not. As an example, a user may specify that a change to a price quote above a certain threshold should trigger an audit. In certain implementations of the status management service that do not also include an implementation of the audit trail service, the "is_auditable( )" method may be omitted.

For example, for business objects to be able to use the audit trail service provided by application server 110, the business objects preferably implement methods that can be called by application server 110 (herein referred to as an "auditable function set"). An exemplary list of methods that can be included in the auditable function set implemented via program 214 are shown below in Table 2. Program 214 may also include attributes, such as a trail stack, as shown below in Table 2. A skilled artisan will appreciate that program 214 is not limited to the exemplary list of methods and attributes and additional or fewer methods or attributes can be used.

TABLE 2

Audit Trail Service

+handle_data_changed(in ChangedObject : IF_AUDITABLE_OBJECT)
+save_stack( )
+load_audit_trail(in SearchCondition)
+archive_audit_trail(in SearchCondition)
−TrailStack The audit trail service may implement a method that may notify application server 110 of a change associated with the business object. For example, after a user modifies the price for a "product" business object and releases the change, for example by pressing <enter> or a confirmation button, the business object can notify application server 110. Moreover, notification of any kind of change to the business object may be prepared and sent to application server 110 by the audit trail service. For example, the creation, deletion, etc. of a business object may cause the audit trail service module to generate and transmit a notification to application server 110.

Furthermore, application server 110 may request information associated with a business object by causing the audit trail service module to implement a method that can return data associated with the business object, such as a globally unique identifier (GUID), a timestamp of the change, an identity of user who made the change, a business object type, etc. Application server 110 may also request specific data regarding the changes that were made to the business object. For example, the audit trail service may implement a method to provide application server 110 with a record of the changes that were made to the business object. Other functionality may be implemented by the audit trail service, such as functionality to store data in repository server 120 and to archive audited data when the data is no longer needed.

Turning to FIG. 3, an exemplary table 300 of a status definition of a business object is shown, consistent with an embodiment of the present invention. The status management service may be configured by table 300. Table 300 may be stored as part of a business object that is stored in, for example, repository server 120. Table 300 may specify the statuses of a particular business object (e.g., Initial, Released, Completed, etc.). Furthermore, as shown in FIG. 3, the status definition of a business object may specify whether certain aspects of the business object are auditable (e.g., With Audit marked by "X"). As discussed above, the method "is_auditable( )" (as shown in Table 1) may read the status definition to determine whether aspects of the business object are auditable. The "is_auditable( )" method may also determine whether certain a business object status should trigger the audit trail service or not.

Figure 4:
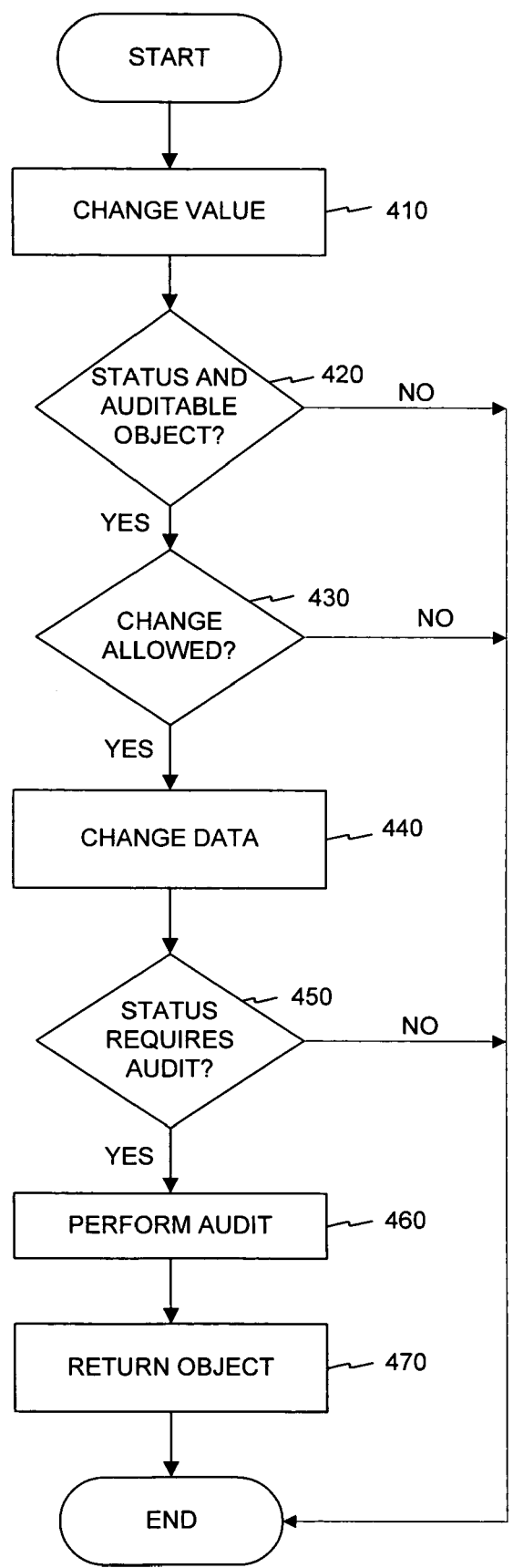
FIG. 4 is a flow diagram of an exemplary method for implementing an interaction service, consistent with an embodiment of the present invention.

Referring now to FIG. 4, a flow diagram 400 is provided of an exemplary method for implementing an interaction service, consistent with an embodiment of the present invention. Although the steps of the flowchart are described in a particular order, one skilled in the art will appreciate that these steps may be performed in a modified or different order. Furthermore, one or more of the steps in FIG. 4 may be performed concurrently or in parallel. In addition, although the steps in the flowchart are described with reference to one client, one of ordinary skill in the art will appreciate that any number of clients could be used in embodiments consistent with the present embodiment.

At the start of the process, a value of a business object is changed by a user or an application (Step 410). For example, an application may be executing on one of terminals 130-150 and the application or a user may change a value of the business object. Storage module 214c may save the change to the value to repository server 120. Next, in step 420, application server 110 determines whether the business object is a status business object and an auditable business object. To determine whether an object is a status business object, application server 110 may determine if the business object includes the "if_status_object" interface. To determine whether an object is an auditable business object, application server 110 may determine if the business object includes "if_auditable_object" interface. If the object is an auditable business object and a status business object, then the process proceeds to step 430. If the object is not an auditable business object or is not a status business object, then the process ends.

Next, application server 110 determines whether the change to the business object is allowed (Step 430). This determination may be accomplished by calling a method (i.e., "check_action_allowed," as shown in Table 1) by application server 110 in order to implement a status management service. The method may be received by receipt module 214d, which may call transmitter module 214b, for example. To determine whether the action is allowed, application server 110 may refer to the status definition of the business object (e.g., such as table 300 of FIG. 3). If the action is allowed, then the process proceeds to step 440. If the action is not allowed, then the process ends. In step 440, the data is changed by application server 110. For example, storage module 214c can store changes to the business object in repository server 120.

In step 450, application server 110 evaluates a method (i.e., "is_auditable") in order to implement an audit trail server to determine whether the new status of the object is auditable.

For example, the "is_auditable" method may evaluate whether a change to the status of the business object is one that requires an audit.

To determine whether the change requires an audit, application server 110 may refer to the "With Audit" column of the status definition of the object e.g., such as the "With Audit" column shown in table 300 of FIG. 3). If the new status is auditable, then the process proceeds to step 460. If the new status is not auditable, then the process ends.

In step 460, since the change has been determined to be auditable, application server 110 audits the change to the object. For example, at the direction of transmitter module 214b, the business object may implement a "get_key" method that can return data associated with the business object such as a globally unique identifier (GUID), a timestamp of the change, an identity of the user who made the change, a business object type, etc. Application server 110 can also request specific data regarding the changes that were made to the business object. For example, an "explain_change" method may provide application server 110 with a record of the changes that were made to the business object. A "product" business object that had a price change may prepare a record showing this change and provide the record to application server 110, for example. In one embodiment, the record may be prepared and stored in any format, such as XML, HTML, text, an image, a sound, or any other appropriate format. Once the auditing process concludes, transmitter module 214b can returns the object to the user or application (Step 470).

Figure 5:
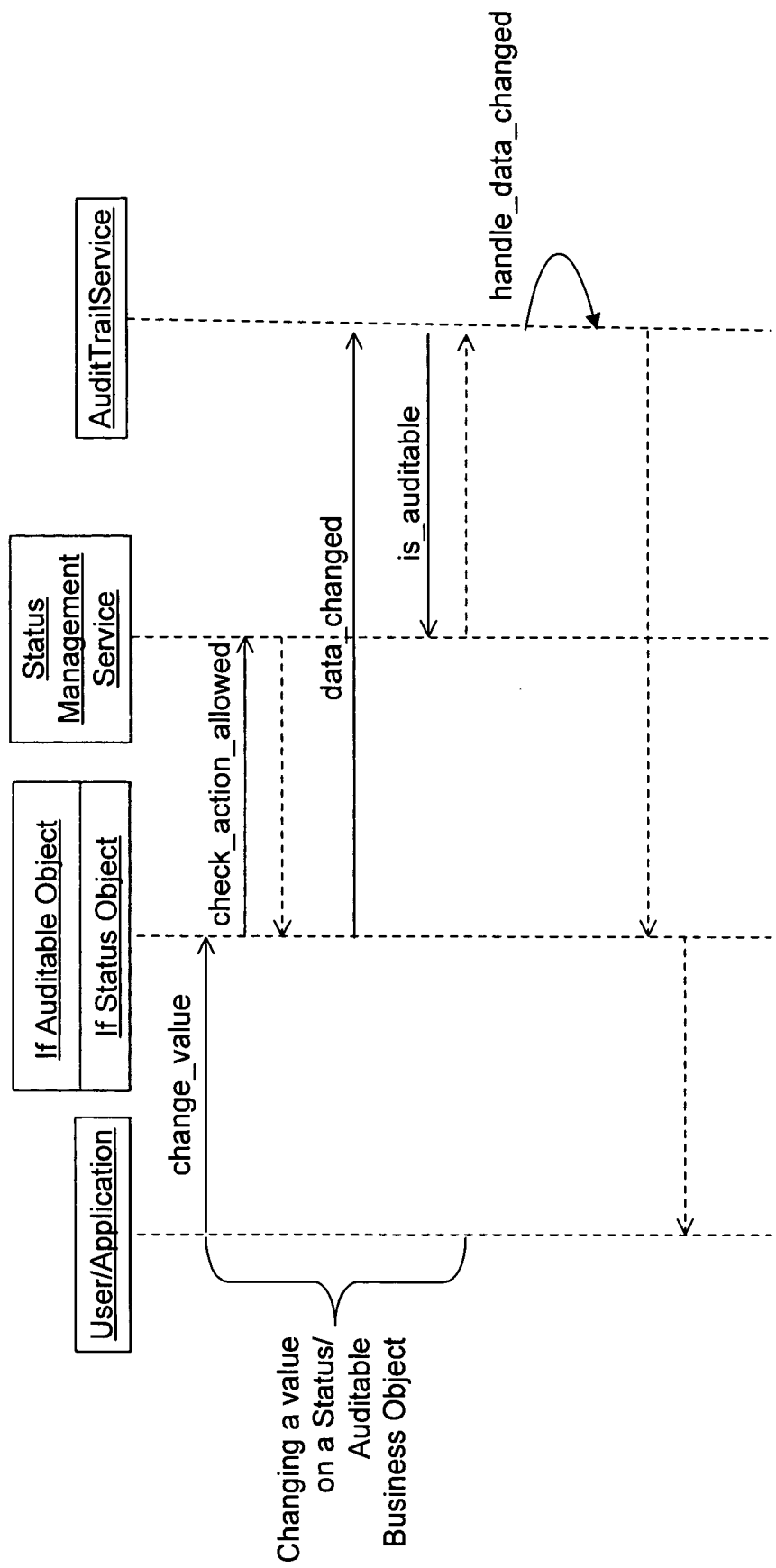
FIG. 5 is a sequence diagram of an exemplary method for changing a value of a status and auditable business object, consistent with embodiments of the present invention.

FIG. 5 shows a sequence diagram of an exemplary method for changing a value of a status and auditable business object, consistent with embodiments of the present invention. In the example shown in FIG. 5, a value of a business object is changed by a user or an application. Once the value has been changed, if the object is an auditable business object and a status business object, then the status management service executed by application server 110 can implement a "check_action_allowed" method. The "check_action_allowed" method can be used to determine whether the change is allowed for a particular business object. If the action is allowed, then the value is changed.

Once the value is changed, then the audit trail service executed by application server 110 may determine whether the new value is auditable. For example, a business object that is configured to use the audit trail service can implement a "data_changed" method. The "data_changed" method can be used to notify application server 110 of any change associated with the business object by, for example, calling the "handle_data_changed" method. For example, after a user modifies the price for a "product" business object and releases the change, for example by pressing <enter> or a confirmation button, the business object can notify application server 110 by invoking the "data_changed" method. Application server 110 may then request specific audit data regarding the changes that were made to the business object.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for providing an interaction between a status management service and an audit trail service, the interaction enabling an audit of a business object when the business object reaches a designated status, comprising:

receiving, at an application server, a change associated with the business object;

determining, in response to the change, whether the business object is a status business object and an auditable business object;

when the business object is a status business object and an auditable business object, determining whether the change to the business object is allowed by calling a first method from a status function set implemented by the business object;

receiving, through the first called method of the status function set, a notification indicating whether the change is allowed;

determining, through a second called method of the status function set, whether the business object has reached the designated status for the audit;

when the business object has reached the designated status, calling a method of an auditable function set implemented by the business object to request auditing data about the business object, wherein the auditing data includes a record of the change along with at least one of a user who made the change, a time associated with the change, and an identifier of the associated business object; and receiving, through the called method of the auditable function set, the requested auditing data.

2. The computer-implemented method of claim 1, further comprising:

storing the received auditing data in a repository.

3. The computer-implemented method of claim 2, wherein the record of the change is in at least one of an XML, HTML, and text format.

4. The computer-implemented method of claim 1, further comprising:

storing the change in a value of the business object in a repository.

5. The computer-implemented method of claim 1, wherein the designated status is based on input specified by a user.

6. A system for providing an interaction between a status management service and an audit trail service, the interaction enabling an audit of a business object when the business object reaches a designated status, the system comprising:

a storage module configured to save a change associated with the business object to memory;

at least one processor configured to determine, in response to the change, whether the business object is a status business object and an auditable business object;

a transmitter module configured to call a first method from a status function set implemented by the business object when the business object is a status business object and an auditable business object, to determine whether the change to the business object is allowed;

wherein the at least one processor is further configured to receive, through the first called method of the status function set, a notification indicating whether the change is allowed;

wherein the transmitter module is further configured to call a second method from the status function set implemented by the business object for determining whether the business object has reached the designated status for the audit;

wherein the transmitter module is further configured to call a method of an auditable function set implemented by the business object to request auditing data about the business object, when the business object has reached the designated status, and wherein the auditing data includes a record of the change along with at least one of a user who made the change, a time associated with the change, and an identifier of the associated business object; and wherein the at least one processor is further configured to receive, through the called method of the auditable function set, the requested auditing data.

7. The system of claim 6, wherein the storage module is further configured to store the received auditing data in a repository.

8. The system of claim 7, wherein the record of the change is in at least one of an XML, HTML, and text format.

9. The system of claim 6, wherein the storage module is further configured to store the change in a value of the business object in a repository.

10. The system of claim 6, wherein the designated status is based on input specified by a user.

11. A computer readable storage medium storing programmable instructions adapted to perform a computer-implemented method for providing an interaction between a status management service and an audit trail service, the interaction enabling an audit of a business object when the business object reaches a designated status, the method comprising:

receiving, at an application server, a change associated with the business object;

determining, in response to the change, whether the business object is a status business object and an auditable business object;

when the business object is a status business object and an auditable business object, determining whether the change to the business object is allowed by calling a first method from a status function set implemented by the business object;

receiving, through the first called method of the status function set, a notification indicating whether the change is allowed;

determining, through a second called method of the status function set, whether the business object has reached the designated status for the audit;

when the business object has reached the designated status, calling a method of an auditable function set implemented by the business object to request auditing data about the business object, wherein the auditing data includes a record of the change along with at least one of a user who made the change, a time associated with the change, and an identifier of the associated business object; and receiving, through the called method of the auditable function set, the requested auditing data.

12. The computer readable storage medium of claim 11, further comprising:

storing the received auditing data in a repository.

13. The computer readable storage medium of claim 12, wherein the record of the change is in at least one of an XML, HTML, and text format.

14. The computer readable storage medium of claim 11, further comprising:

storing the change in a value of the business object in a repository.

15. The computer readable storage medium of claim 11, wherein the designated status is based on input specified by a user.

* * * * *